United States Patent [19]

Sillivent et al.

[11] Patent Number: 4,520,917
[45] Date of Patent: Jun. 4, 1985

[54] CONVEYOR BELT CLEANING METHODS AND APPARATUSES THEREFOR

[75] Inventors: Bob Sillivent; Clifford Sillivent, both of Amarillo, Tex.

[73] Assignees: Thomas J. Wright, Alburqueque, N. Mex.; Mike L. Burns, Amarillo, Tex.

[21] Appl. No.: 354,298

[22] Filed: Mar. 3, 1982

[51] Int. Cl.³ .............................................. B65G 45/00
[52] U.S. Cl. ........................................ 198/499; 355/15
[58] Field of Search ...................... 198/497, 499, 691; 15/256.5, 256.6; 355/15

[56] References Cited

U.S. PATENT DOCUMENTS

| | | | |
|---|---|---|---|
| 1,580,638 | 4/1926 | Benbow | 198/497 |
| 2,514,780 | 7/1950 | McGovern | 198/499 X |
| 3,288,275 | 11/1966 | Bunting | 198/498 |
| 3,315,794 | 4/1967 | Ellington | 198/499 |
| 3,660,863 | 5/1972 | Gerbasi | 355/15 |
| 3,973,845 | 8/1976 | Lindblad et al. | 15/256.5 X |
| 4,257,517 | 3/1981 | MacPherson et al. | 198/497 |
| 4,269,301 | 5/1981 | Gibbs | 198/499 |

Primary Examiner—Jeffrey V. Nase
Attorney, Agent, or Firm—Fidelman, Wolffe & Waldron

[57] ABSTRACT

Scrapers of particular mechanical, chemical, and electrical properties are arranged to maintain mechanical and electrical contact with the surfaces of moving belt conveyors so as to provide for rapid electrical discharge of such surfaces and the particles on such surfaces and the mechanical removal of such particles from such surfaces during the brief time that such surfaces are in the intended zone of discharge of particulate material therefrom.

6 Claims, 8 Drawing Figures

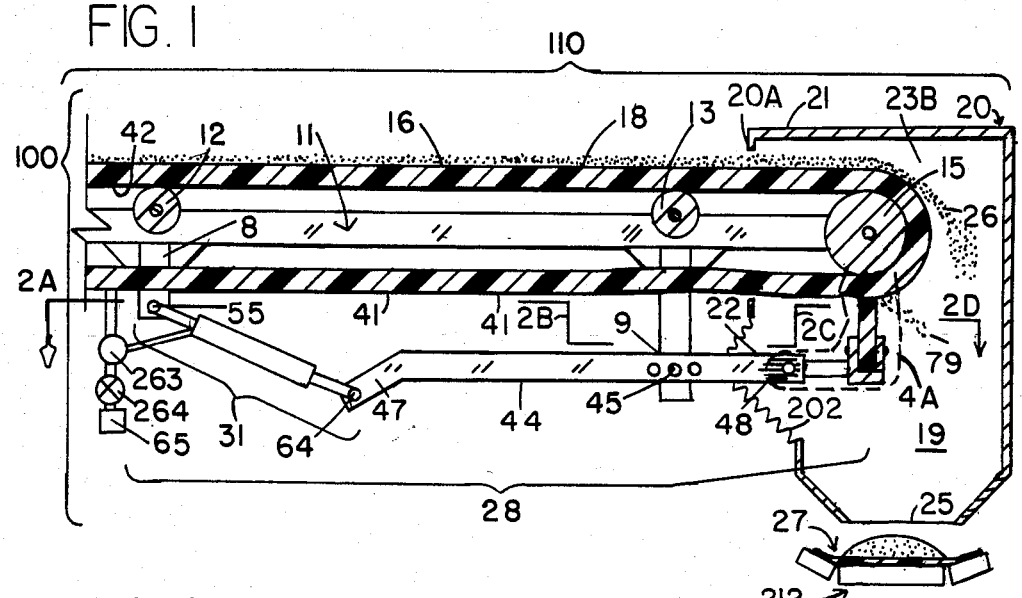
FIG. 1
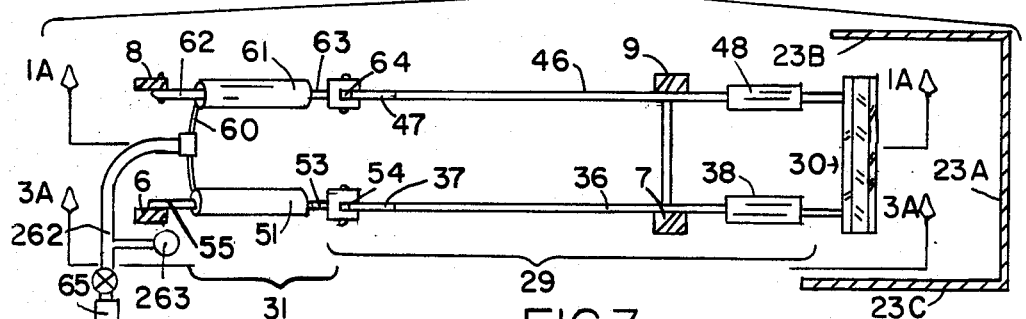
FIG. 2
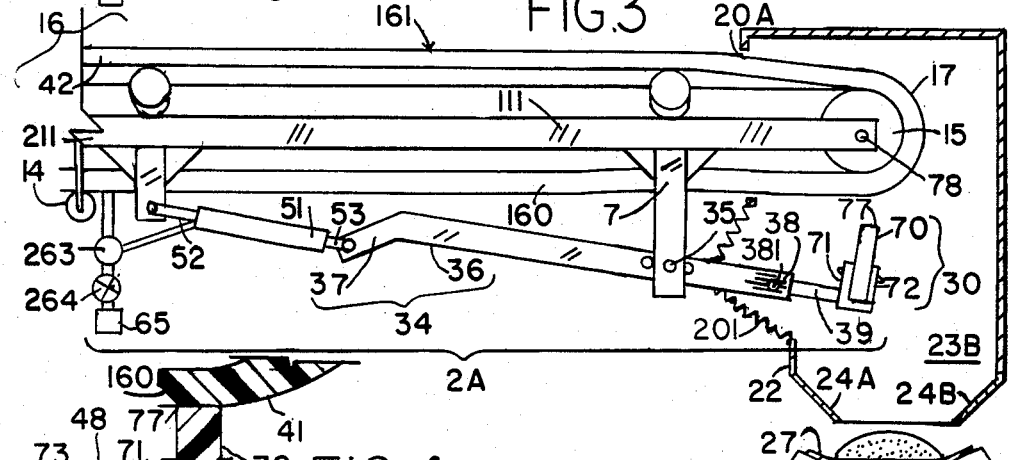
FIG. 3
FIG. 4

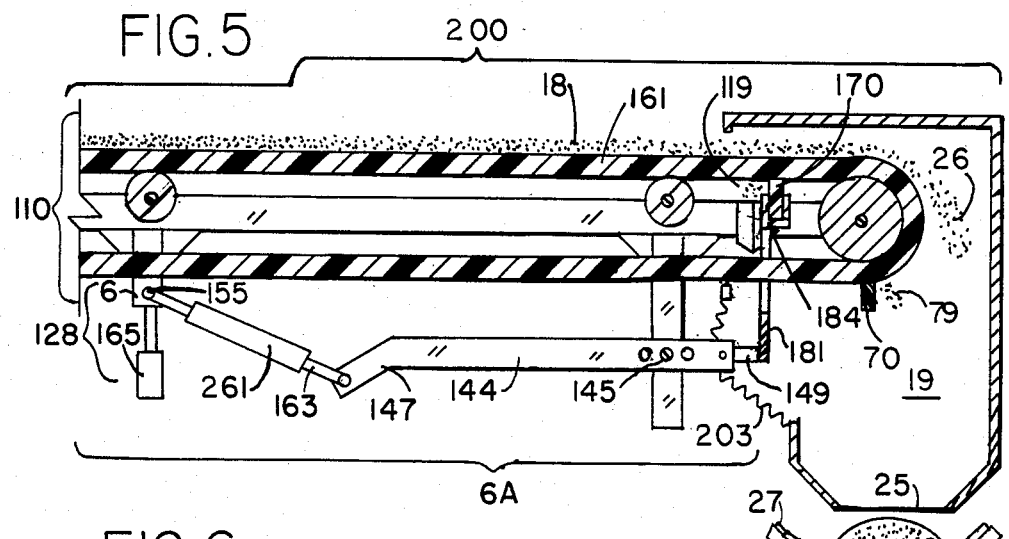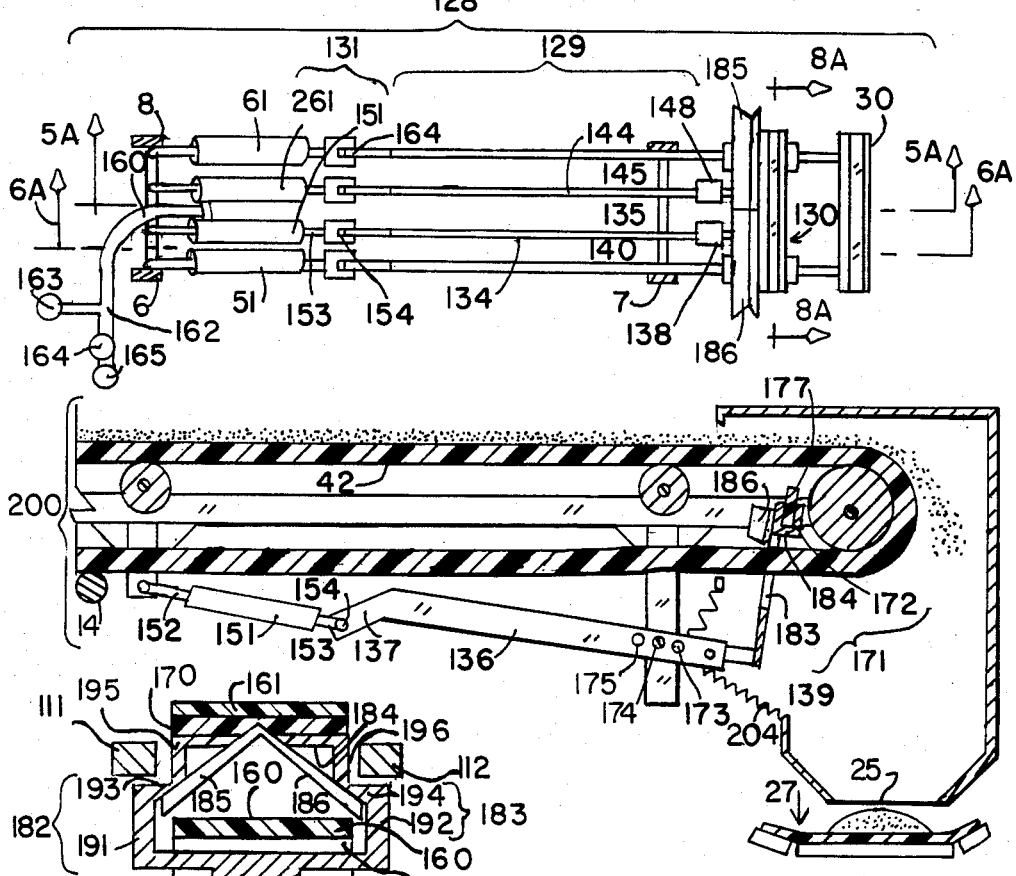

CONVEYOR BELT CLEANING METHODS AND APPARATUSES THEREFOR

BACKGROUND OF THE INVENTION

1. Field of the Invention

This invention relates to particulate material handling and operation of belt conveyors.

2. Description of the Prior Art

During travel of a mass of dry particulate material on a rubber conveyer belt, especially belts of long length, vibrations develop because of the oscillation of the belt in the vertical direction between the idler rollers. Such oscillation provides that the finer of the particles on the belt move downward toward the belt and contact it and adhere thereto. The electrostatic effects developed by result of friction of the belt with the driving and driven pulleys and idler rollers and the high electrical resistivity of the belt develops electrostatic forces between the belt and the fine particles which provides that in the normal course of events electrical charges accumulate both on the interior surface of the belt, and by induction, on the exterior surface of the belt. This in turn interferes with and or prevents the discharge of solid fine particles from such belt surfaces when such material passes over the driving or discharge pulley of such belt to the point of intended discharge of material from such belt and so provides a build up of such solid fine particles from such belt surfaces when such material passes over the driving or discharge pulley of such belt to the point of intended discharge of material from such belt and so provides a build up of such fine particles and adherence of such fine particles to the adjacent portion of the surface of the belt. On the return path of the belt during which path of travel the belt surface facing downward is the belt surface which had theretofore been contacted by the fine particles the fine particles not dropped from the belt portion at the intended point of discharge (during the interval of time during which the belt portion carrying such particles was in the zone at which such particles might have passed to the intended discharge path) are dropped from the belt along the space below the belt between the drive pulley and the conventional driven pulleys of such belts and creates an accumulation of dust which is a hazard both to health of operators and as to fire development. By the apparatuses of this invention accumulations of such particulate material on the belt is avoided.

SUMMARY OF THE INVENTION

An apparently unrecognized characteristic of moving conveyer belts is that the discharge of particulate material therefrom is not instantaneous because of the electrical characteristics of the moving belt as a dielectric in an electrical condenser.

This invention is based on practical appreciation of factors of time delay and concomitant interference with electrical and mechanical discharge of particulate material from successive increments of belt conveyer surfaces in the brief time such increments of belt length are successively located in the discharge zone of such moving belt conveyors and the design of apparatuses to effectuate steps needed to correct for such interfering factors.

BRIEF DESCRIPTION OF THE DRAWINGS

FIG. 1 is a diagrammatic vertical longitudinal section along the plane 1A—1A of FIG. 2 showing one embodiment of belt scraper assembly 28 according to this invention in its operative or belt-engaging position in the apparatus embodiment 100.

FIG. 2 is a plan view of elements of the belt scraper assembly 28 in zone 2A of FIG. 3 along broken section 2A-2B-2C-2D of FIG. 1.

FIG. 3 is a diagrammatic side view of the apparatus of FIGS. 1 and 2 as seen along the vertical plane 3A—3A of FIG. 2 with belt scraper assembly 28 in its open or disengaged position.

FIG. 4 is an enlarged diagrammatic view of zone 4A in FIG. 1.

FIG. 5 is a diagrammatic vertical longitudinal section along the plane 5A—5A of FIG. 6 showing an embodiment of scraper assembly 128 according to this invention in its operative or belt-engaging position in the apparatus embodiment 200. For purposes of clarity of representation, FIGS. 5 and 6 show only the principle parts of assembly 128 in the assembly 200. FIGS. 6 and 8 show the parts of assembly 28 and 128 in assembly 200.

FIG. 6 is a plan view of elements of the belt scraper assembly 128 in zone 6A of FIG. 5.

FIG. 7 is a diagrammatic vertical longitudinal sectional view of the apparatus of FIGS. 5 and 6 as seen along the vertical plane 7A—7A of FIG. 6 with scraper assembly 128 in its open or disengaged position.

FIG. 8 is a diagrammatic transverse vertical sectional view along plane 8A—8A of FIG. 6.

DESCRIPTION OF THE PREFERRED EMBODIMENTS

The apparatus embodiment 100 comprises a conventional conveyer belt assembly 110 and an exterior belt surface scraper assembly 28. The conveyer belt assembly 110 comprises a rigid conveyor belt assembly frame 11 with a series of like upper sets of idler rollers 12 and 13 lower idler rollers as 14 and a drive roller 15. The upper sets of rollers are conventionally arranged with a central lower roller and peripheral or lateral rollers at an angle to the central roller on each side thereof. The discharge roller 15 has a surface which is cylindrical or may be centrally slightly crowned.

Each upper set of roller as 12 comprises, as shown for the idler roller set 212 on conveyor assembly 27, a horizontally extending central lower transverse roller 213 and, laterally thereof, rollers as 214 and 215 extending transversely to the length of the belt (as 16 or 216) which lateral rollers are at an angle to the horizontal and provide an upwardly concave shape to portions of the upper surface of the belt as 15 or 216 supported by such rollers.

As diagrammatically shown in FIG. 1 there are portions of the belt 16 which do not directly contact the rollers for the upper set of idler rollers.

The lower interior surface, 42, of the upper run or length 161 of a conventional rubber conveyer belt 16 rides on top of the upper set of rollers. At the upper run portion of its path of travel belt carries particulate material toward the drive roller 15. The belt 16 contacts and fits and curves around the cylindrical drive roller 15 at a front portion 17 of that belt. On the return path or lower run length 160 of the belt, from the drive pulley to the driven pulley, the exterior surface, 41 of the belt rides on idler rollers as 14. A mass of particulate material 18 as crushed coal, theretofore carried on the upper run 161 of belt 16, is discharged from belt portion 17 into the interior chamber 19 of a hood 20. The hood 20 has an opening 20-A, a rigid imperforate roof 21, a rigid generally imperforate rear wall 22, an imperforate front wall 23-A, side walls 23-B and 23-C, and tapered lower walls 24-A and 24-B and a lower opening 25 which provide for guidance of a mass of discharged material as 26 onto a second conveyor 27.

The exterior belt surface scraper assembly 28 comprises a belt scraper control arm sub-assembly 29, a blade sub-assembly 30, and a piston sub-assembly 31. The sub-assemblies 29 and 30 of assembly 28 are attached to the belt conveyer frame 11 via a plurality of rigid anchor bracket supports as 6, 7, 8, and 9 therefor, each of which supports is firmly attached at one end to the frame 11. The control arm sub-assembly 29 comprises a pair of like rigid arms 34 and 44, each pivotally connected at a pivotal support as 35 and 45 respectively to a front vertically extending anchor bracket support therefor as 7 and 9 respectively. Each arm as 34 and 44 is formed of a first straight solid central rigid horizontal steel portion 36 and 46 and a second straight rigid rear solid steel portion 37 bent at an angle to the portion 36. A forwardly extending hollow tubular or sleeve portion as 38 and 48 extends horizontally forwardly of portion 36 and 46 in the position of parts shown in FIG. 1. The bent, or rear, portion 37 and 47 of each of the arms 34 and 44 is connected to the piston sub-assembly 31.

The piston sub-assembly 31 comprises a pair of like pistons 51 and 61 each, as shown for 51, having a rear clevis as 52 and a straight extensible piston arm 53. One end of the piston arm as 53 is pivotally connected at a front pivot as pin 54 fixed to a bent or rear arm portion as 37 of the adjacent arm as 34. Each clevis as 52 is connected at a rear pivotal pin support therefor as 55 on a bracket supports as 6 or 8, which rear pivotal pin support is higher than the front pivot pin 54 so that a straight line passing through the rear support for the clevis 52 and the central longitudinal axis of piston cylinder 51 and center of the piston arm 53 extends downwardly and forwardly, to the right as shown in FIG. 1, in the operative position of the scraper assembly 28. Similarly a straight line passing through the support for rear clevis of the cylinder 61, the axis of cylinder 61 and its piston arm 63 extends downwardly and forwardly, parallel to the line passing through the cylindrical piston cylinder 51. A flexible pneumatic connector conduit hose 60 operatively joins the interior chambers of piston cylinders 51 and 61. A tee connector 262 is operatively connected to a pressure gauge 263 and the conduit hose or line 60 extends past the tee 262 and valve 264 to a conventional connector 65 which is releasably connected to a source of air pressure for actuating the pistons 51 and 61, which pistons may be conventional automotive shock absorbers.

The blade assembly 30 comprises a flexible flat surfaced scraper blade 70, a rigid steel blade bracket support 71 having an L-shaped transverse cross-section, and a flat blade bracket plate 72. The scraper blade 70 is firmly held between the L-sectioned bracket 71 and the plate 72 by screws passing between the plate 72 and bracket 71 through the blade 70 and extends transversely to the length of belt 16 and extends laterally or peripherally of the sides of belt 16. Rigid steel plugs 39 and 49 are rigidly and firmly connected to the rear of the L-shaped bracket 71 and each plug has a plurality of longitudinally spaced apart transverse holes therein as 73, 74, and 75 which match holes therefor in the arm sleeve portions 38 and 48 to allow for longitudinal adjustment of the blade 70 relative to the spatially fixedly located supports 35 and 45 for the arms 34 and 44.

The belt scraper blade 70 is thus firmly held by the control arm sub-assembly 29 and the rear end of each of the pair of arms 34 and 44 connects to and is moved by the piston subassembly 31 and each of the arms 34 and 44 is pivotally held at a bearing as 35 and 45 which is in fixed spatial relationship to the frame 11 of the conveyer belt assembly 110 and its belt 16.

The upper, operating edge 77 of the scraper blade 70 exactly matches the contour of the belt on the roller 15; for a straight edged or cylindrical pulley 15, edge 70 is the straight edge of a solid rectangular prismatic piece of plastic of particular electrical, mechanical and chemical characteristics. The upper edge of blade 70 is, in its operative position as shown in FIG. 1, positioned at a location on the exterior belt surface 41 which is vertically below the center of the axle 78 of the drive pulley 15. The exterior scraper surface assembly system 28 provides for rapid and relatively complete removal of accumulated particulate material, especially coal, that may continue to adhere to the belt as 16 of which the interior surface is clean following the discharge of the major bulk of the material as 26 from that belt at a discharge zone therefor, as the chamber 19 of the hood 20. Such removal is evidenced by the absence of coal dust deposited between the drive pulley 15 and the driven pulley below the lower or return run 160 of the belt 16. In the overall this system provides that there is no interference with the movement of the belt as 16 by the belt scraper 70. The resiliency and elasticity of the pistons 51 and 61 serve to inhibit oscillation of blade 70 and also accomodate for wear of that blade and maintain a constant and adequate pressure of the blade 70 on the exterior belt surface. The absence of vibration assists in the overall belt operation and avoids development of oscillations therein. Vibration is minimized because there is a mechanically and spatially stable—although moving—structure against which the face or edge 77 of the blade 70 is applied; that structure is the rigid mass of roller 15 and belting 16, which provides no opportunity for the elasticity of the belt between the drive roller 15 and an adjacent roller to vary the position of contact area of belt and blade.

The blade 70 has a substantial degree of toughness and does not wear out because of contact with the material carried by the belt for a commercially satisfactory period of time, (although it may wear out eventually). However the material of blade 70 is selected and made to have a surface hardness that is tough but is softer than is the rubber material of the belt 16 and is pressed against the belt only with a limited pressure so as to not cause the blade to wear substantially. Additionally, the chemical composition and electrical characteristics of the blade are such that coal dust on the belt comes off evenly and smoothly and rapidly from the exterior surface belt at 79 in the discharge zone of the belt and does not form clumps. The metallic arms 34 and 44 make a sufficiently adequate electrical contact from blade 70 and through the metal pivots 35 and 45 with the metal frame 11 and the blade 70 has adequate electrical conductivity to remove build-up of electrostatic charge on the exterior surface of the belt that might otherwise cause adherence of the fine dry particles to that surface of the belt. Not only is the blade 70 electrically conductive but, also, it is sufficiently resistant to oils that it "bites" or readily passes through the particulate mass which is adjacent to and theretofore adherent to the exterior rubber belt surface 41 and, thereby, the blade 70 makes a good mechanical and electrical contact with that belt surface. The blade material or composition is critical to this combination of elements as the blade material is adapted to rapidly pass accumulated static electrical charges from the belt. Thus the blade 70 also has sufficient mechanical strength and hardness to make a good mechanical and electrical contact with the exterior belt surface 41 as well as having the oil resistant characteristics that provide that it permits no accumulation of oily material thereon, whereby the belt edge 77 directly contacts all portions or increments of the exterior belt surface and thereby effectively scrapes and removes substantially all particulate material from each of the increments or portions of that surface of the belt while each such increment or portion of the belt of which the interior surface is clean is in the discharge zone as 19 for that belt.

The material of which the belt scraper blade 70 is made is a poly urethane polymer having a Shore A hardness of 80 durometer and a tensile strength of 3500–4000 p.s.i. It also has a tear strength measured in p.l.i. of 650 and has a elongation of 650% and has a melting point of 200 degrees and is oil and water resistant. Each of the pistons 51 and 61 have an internal diameter of 7/8 of an inch and a pneumatic pressure is maintained therein of 28 pounds per square inch for a standard 56 inch wide conveyor belt as 16 made of 2 to 4 ply rubber. The chemical properties and components of such poly urethane are given at Table I hereinbelow.

Other elastomers such as poly-propylene glycol elastomers of like tear strength (over 420 p.l.i) and having over 500% elongation and Shore hardness in excess of 80 may also be used as well as conductive rubbers of such characteristics.

Such a urethane composition is sold under the name of Tuffgard II, a trademark of Hewitt Robbins a subsidary of Litton systems Inc., a corporation of Delaware.

Apparatus 200 shown in FIGS. 5, 6, 7, and 8 comprises a conventional belt conveyor assembly 110, the exterior belt surface scraper assembly 28, and an interior belt surface scraper assembly 128.

The interior belt surface scraper assembly 128 comprises an interior belt surface scraper control arm sub-assembly 129, a blade sub-assembly 130, and a piston sub-assembly 13. The sub-assemblies of assembly 128 are attached to the belt conveyer frame 11 at a plurality of rigid anchor bracket supports as 6, 7, 8, and 9 therefor. The scraper control arm sub-assembly 129 comprises a pair of like rigid arms 134 and 144, each pivotally connected at a pivotal support joint as 135 and 145 respectively on a rigid transverse rod 140 to front vertically extending anchor bracket supports therefor as 7 and 9 respectively. Each arm as 134 and 144 is formed of a first straight solid central rigid horizontal steel portion 136 and 146 respectively and a second straight rigid rear solid steel portion 137 and 147 bent at an angle to portions 136 and 146 respectively. A forwardly extending hollow tubular or sleeve portion as 138 and 148 extends horizontally forwardly of portion 136 and 146 respectively in the position of parts shown in FIG. 5. The bent, or rear, portion 137 and 147 of each of the arms 134 and 144 is connected to the piston sub-assembly 131.

The piston sub-assembly 131 comprises a pair of like pistons 151 and 261 each like pistons 51 and 61 and each, as shown for 151, having a rear pivot support connection as 52 and a forward straight extensible piston arm 153. One end of the piston arm as 153 is pivotally connected at a front pivot joint as 154 fixed to a bent or rear arm portion as 137 of the adjacent arm as 134. Each rear pivot connection as 152 is connected at a rear pivotal pin support therefor as 155 on a bracket as 8, which rear pivotal support is higher than the front pivot pin 154 so that a straight line passing through the rear support for 152 and the central longitudinal axis of piston cylinder 151 and center of the piston arm 153 extends downwardly and forwardly, to the right as shown in FIGS. 5 and 6, in the operative position of the scraper assembly 128. Similarly a straight line passing through the rear pivotal support of the cylinder 261, the axis of cylinder 261 and its piston arm 163 extends downwardly and forwardly, parallel to the line passing through the cylindrical piston cylinder 151. A flexible pneumatic connector conduit hose 160 operatively joins the interior chambers of piston cylinders 151 and 261. A tee connector 162 is operatively connected to a pressure gauge 163 and the conduit hose or line 160 extends past the tee 162 to a conventional cut off valve and connector 165 which is releasably connected to a source of air pressure for actuating the pistons 151 and 161 which pistons may be conventional automotive shock absorbers.

The interior belt surface blade assembly 130 comprises a flexible flat surfaced interior belt surface scraper blade 170, a rigid steel scraper blade bracket support 171 having an upper L-shaped transverse cross section 184, and a flat scraper blade 170 and a bracket clamp plate 172.

The bracket support 171 comprise a lower rigid steel bottom bracket support plate 181, angled steel left and right side bracket support arms 182 and 183, and an upper L-shaped in transverse section steel blade clamp bracket 184, and discharge spouts 185 and 186. The support plate 181 extends horizontally laterally of and below the lower, return run or length 160 of belt 16 and transversely to the length of belt 16. The angled steel side bracket support arms 182 and 183 are rigid and are firmly and rigidly are attached at their lower ends to the lateral ends of plate 181 and extend, (at portions 191 and 192 of arms 182 and 183 respectively) laterally of the belt run 160 with portions which, are (at portion 193 and 194 of arms 182 and 183) located inwardly of the frame 11 and above the lower belt run 160, and, (at portions 195 and 196 of arm 182 and 183) extend upwardly inwardly of frame 11 below belt run 161. The upper end of arms 182 and 183 are located inwardly of the side frame members 111 and 112 of frame 11 of assembly 110 and below the upper run 161 of belt 16 and are rigidly and firmly attached to the L-sectioned steel bracket 184.

Bracket 184 extends transversly of the length of belt 160 and extends laterally of the side edges of belt 16. The scraper blade 170 is firmly held between the L sectioned bracket 184 and a plate 172 by screws passing between the plate 72 and bracket 184 through the blade 170. Each of L-shaped section 184 and blade 170 extend transversely to the length of belt 16 and extends laterally to both side edges of that belt.

Rigid steel plugs 139 and 149 are rigidly and firmly connected to the rear of the lower bracket support plate 181 and each plug has a plurality of longitudinally spaced apart transverse holes therein as 73, 74, and 75 which match holes therefor in the arm sleeve portions 138 and 148 to allow for longitudinal adjustment of the blade 170 relative to the spatially fixedly located pivotal supports 135 and 145 for the arms 134 and 144 respectively.

The belt scraper blade 170 is thus firmly held by the control arm sub-assembly 129 and the rear end of each of the pair of arms 134 and 144 connects to and is moved by the piston subassembly 131 and each of the arms 134 and 144 is pivotally held at a bearing as 135 and 145 which is in fixed spatial relationship to the frame 11 of the conveyor belt assembly 110 and its belt 16.

The upper, operating edge 177 of the scraper blade 170 exactly matches the contour of the interior or lower surface 42 of belt 16 adjacent the roller 15. For a straight edged or cylindrical pulley 15, edge 177 is a straight edge of a solid rectangular prismatic piece of plastic of particular electrostatic, mechanical and chemical characterstics. The length of the upper edge 177 of blade 170 is, in its operative position as shown in FIG. 5 parallel to the longitudinal axis 98 of the pulley 15. Edge 177 is in contact with and adjacent to the interior or lower belt surface 42 of the upper run or length 161 of belt 16 as close as possible to the pulley 15 but out of contact therewith; generally the right hand (as shown in FIGS. 5-7) edge of the plate 172 is at a distance from the center of the axle of the roller 15 that is ½ to 1 inch greater than the maximum radius of the roller 15.

The blade 170 has a substantial degree of hardness and does not wear out because of contact with the material carried by the belt for a commercially satisfactory period of time, (although it may wear out eventually). However the material of blade 170 is the same as that of blade 70 and selected and made to have a surface hardness that is not harder than the rubber surface material of belt 16 and is pressed against the blade only with a limited pressure so as to not cause the belt to wear substantially. Additionally the chemical composition and electrical characteristics of the blade 170, like 70, are such that dust on the bottom belt surface comes off evenly and smoothly and rapidly from the belt in the intended discharge zone thereof as at 119. The metallic arms 134 and 144 make a sufficiently adequate electrical contact from blade 170 through the metal pivots 35 and 45 with the metal frame 11 and the blade 170 has adequate electrical conductivity and contact with belt surface 160 to remove build-up of electrostatic charge on the interior surface of the belt that might otherwise cause adherence of the fine dry particles to that surface of the belt. Not only is the blade 170 electrically conductive but also it is sufficiently resistant to oils that it "bites" or readily passes through the particulate mass which is adjacent to and theretofore adherent to the interior rubber belt surface 42 and thereby the blade 170 makes a good mechanical and electrical contact with that belt surface. The blade material or composition is critical to this combination of elements as the blade material is adapted to pass accumulated static electrical charges from the belt and the blade 170 also has sufficient mechanical strength and hardness to make a good mechanical and electrical contact with the belt surface 42 as well as having the oil resistant characteristics that provide that it produces no accumulation of oily material thereon, whereby the belt edge 177 directly contacts all portions or increments of the interior belt surface and thereby effectively scrapes and removes substantially all particulate material from each of the increments or portions of that surface of the belt prior to such belt increment reaching the pulley 15. Especially as the upper idler rollers as 12 and 13 and 212 of conveyor belts as 16 and 27 do not contact all portions of the interior surface of the moving belt thereabove, the use of the discharge assembly 128 on the interior surface provides for removal of the portion of the charges remaining on the interior increments or portions of such surface not contacted by the electrical grounding elements such as the idler rollers. Such failure of contact would (otherwise than if assembly 128 were used) result in particles that are on the interior belt surface and charged continuing to adhere to the interior surface of the moving belt. While the drive roller 15 provides good electrical contact with those portions of the bottom surface of the moving belt where it effects mechanical contact therewith, accumulation of the charged particles on the bottom or interior surface of the belt 16 results in mechanically holding apart some parts of the moving belt interior surface from the neighboring roller surface, with consequent failure of effective electrical contact therebetween. Whether or not such belt portions be subsequently partially electrically discharged during their passage around the curved portion 17 of the roller 15 such adherent particles on the bottom or interior portion of the belt are usually mechanically entrapped between the interior surface of the moving belt and the roller 15 and are thereby mechanically carried to the return portion of the belt path on its upper surface. The discharge of the interior portion of the moving belt by a complete contact of all increments thereof by the interior belt surface scraper blade assembly 128 provides for an electrical contact of all successive increments of the interior belt surface prior to the passage of each of those increments of interior surface of the moving belt on to the rotating drive roller 15 and provides for removal of theretofor adherent particulate material from the belt prior to possible entrapment between the rotating surface and the interior surface of the moving belt. This removal of particulate material improves the electrical contact of the roller and all increments of the interior surface of the belt and provides for more rapid discharge of the particulate accumulations on the exterior surface. Such rapidity of discharge is significant in view of the short time available for contact of the moving belt and rotating roller 15 during travel of the belt around the roller 15 at portion 17 in zone 26 and the electrical capacity of the belt 16.

In general, the effect of the electrical capacity of the moving belt is like the dielectric in an electric condenser, with a finite time required for each increment of electrical discharge of such condenser. The contact of the scraper 70 on the exterior surface of the moving belt provides a substantial removal of particulate material and is a substantial improvement over the prior art; however such efficiency depends on the condition of the interior surface of the belt so the electrical discharge and removal of the particulate material from the interior surface of the belt by assembly 128 improves the electrical contact of the roller with all the interior surface increments of the belt and so permits a rapid and complete electrical discharge of such surface and particulate material thereon. The belt has a finite electrical capacity between its inner surface and outer surface and there are electrical resistances between the inner surface of the belt and the roller surface because of (a) any accumulation of particles thereon, especially of the oily type, as well as (b) because of mechanical spacing apart of increments of the interior moving belt surface and roller surface by such accumulation and resulting lack or electrical contact between rotating roller surface and such moving belt surface increments by bridging of the belt across such solid accumulations. The belt scraping assembly 128 provides for removal of such material with its electrical resistance characteristics and so, in a given time—the short time of contact of rotating drive roller and moving belt with each successive increment of belt length is in contact with the drive roller in the discharge zone—provides for an improved removal of charges and particulate material and thereby supplements the removal of the charges and particulate material from the exterior surface of the moving belt by the assembly 28.

The spouts 195 and 196 are rigid troughs which are arranged to slope laterally and downwardly from an upper central position on the side of blade 170 distant from the roller 15—the left hand side as shown in the FIGS. 5–7. Thereby the particulate material removed from the interior surface of increment of the belt length as at 119 prior to such increments of length reaching the roller surface are passed laterally to a zone where at such discharged particles are collected such as the hood 20 and so avoid the passage of such particles from the interior surface of the belt on its upper run 161 to the interior surface of the belt on its lower rung 160. The troughs are rigid smooth imperforate plates provided with a groove open upwardly and are fixedly attached and adjacent to the bracket 184 and extend laterally thereof to a terminal lateral portion lateral to the lateral sides of the belt 16 at its lower run or length. Material discharged from the lower surface of the belt by the blade 170 accordingly is collected in such troughs and passed downwardly and laterally along such troughs out of contact with the lower run of the belt and is collected in the hood 20. The hood 20 is provided with flexible and extensible or connecting elements as 201, 202, 203 and 204 each of which engages an arms as 34, 44, 134, and 144 and thereby provide a dust-tight enclosure below the level of the lower run of belt to provide for avoidance of downward escape of dust from the belt and from the interior of the hood to points exterior thereof except to the lower discharge 25 of the hood and the conveyor belt 27 therebelow. The arm 34, like arm 44, 134 and 144, has a plurality of longitudinally spaced apart holes 173, 174, and 175 to allow longitudinal adjustment of those arms relative to the pivotal supports therefor. Each sleeve portions as 38 has a hole as 381 to receive a bolt to match a hole as 73, 74 or 75 in plug as 39 therefor.

As each of the blade edges 77 and 177 is softer than the surface of the belt contacted thereby, it wears to the exact shape of the belt surface and makes an extremely good mechanical contct and electrical connection therewith. However, the blade edge is made of material which is sufficiently tough that it does not tear in spite of the movement of the belt in contact therewith. The air pressure in the piston assemblies 31 and 131 provides a continuous resilient contact of the blade edges and the moving belt surfaces 41 and 42 to compensate for wear. The width of the blades (measured along the length of the belt and transverse to the length of the blades) provides an adequate time of electrical contact and adequate area of mechanical and electrical contact with the belt surface to provide substantially complete discharge of the belt surfaces' electrostatic charges and, consequently, removal of particulate material adherent to the belt surfaces contacted by such blade edges.

TABLE 1

| Physical Test Characteristics of Blade 70 Material: | |
| --- | --- |
| (1) Shore A 80 durometer | |
| (2) Ultimate tensile strength | 6500 p.s.i. |
| (3) Tensile strength | (a) 435 p.s.i. at 50% extension |
| | (b) 530 p.s.i. at 100% extension |
| | (c) 1000 p.s.i. at 300% extension |
| | (d) ultimate elongation 650% extension |
| (4) Melting point | 200° F. |
| (5) Compression set B | 11 hrs at 150° F. is 25 |
| (6) Tear strength | 420 p.l.i. die C (ASTM D 624) |

A composition therefor is prepolymer F242 (100 parts) MOBAY and 1,4 Butanediol (7 parts) and stannous octoate (0.03 parts). Variations thereof are as set out at pages 447 and 448 of "Rubber Technology" by M. Morton, Van Nostrand Reinhold Co., New York, 1973. Generally, the isocyonate-amine and isocyonate-alcohol reactions provide chemical groups that provide electrical resistivity of about $10^{-7}$ to $10^{-8}$ ohm. cm. which is sufficiently low for the necessary anti-static purposes of the system, as described in "Conductive Rubber and Plastics", by R. H. Norman, Elsevier Publishing Co., New York, 1970, pages 83 to 91.

TABLE 2

| Dimensions of Scraper Assembly: | |
| --- | --- |
| Arm 34 (and 44) | |
| total length (left end of 37 to right end of 38) = 49½" | |
| portion 36, | ¼ × 2" plate |
| length, | 30 inch |
| portion 38, | 1¼" i.d. pipe ⅛" base |
| length, | 15½ inch |
| hole 381, (for pin through holes 73, 74 or 75) | |
| diameter, | ½ inch |
| portion 37, | ¼ × 2" |
| length (maximum) | 8" |
| Brackets 6 and 8, | ⅜" × 2" × 2" angle |
| length | 11¾" |
| hole (⅜") | 1" from lower end |
| Brackets 7, 9, | ¼" × 2" × 2" angle |
| length | 6¾" |
| holes (⅜") | ¼" & 1½" from bottom end |
| Plug 39 | 1" i.d. pipe, |
| length | 12" |
| wall | ⅛" |
| holes as 73, 74, 75 | ⅜" diameter at 2¼", 3⅞", 5¼", 6⅝", 8¼", 9⅝" from left (FIG. 4) end of plug. |
| Plate 71 | ¼ × 2" × 1" angle |
| length | 42" |
| holes | ⅜" diameter at ¼", 2¼", 11¾, 21", 30¼", 39½", 4½" from left side (top in FIGS. 2 and 6) |
| Plate 72 | ¼ × 2" |
| length | 42" |
| holes | ⅜" diameter at ¼", 2¼", 11¾", 21", 30¼", 39½", 4½" from left side (top in FIGS. 2 and 6) |
| Sizes of components of apparatus 128 are similar. | |
| All above members are steel. | |
| Blade 70 | |
| thickness | ¼" |
| length | 42" |
| height | 2¼ to 3" |

We claim:

1. In combination, a conveyer belt assembly and an electrically conductive exterior belt surface scraper assembly, said conveyor belt assembly comprising a rigid conveyor belt assembly frame, a series of like upper sets of idler rollers, lower idler rollers and a drive roller, each upper set of rollers comprising a horizontally extending central lower transverse roller and, laterally thereof, rollers extending transversely to the length of the belt which lateral rollers are at an angle to the horizontal portions of the belt, a lower, interior, surface of an upper run of said conveyer belt on top of the upper set of rollers, said upper run carrying particulate material toward a drive roller and said belt contacting and curving around said drive roller at a front portion of said belt, a return lower path of said belt extending from the drive pulley to a driven pulley and the exterior lower surface of the belt then riding on idler rollers, said exterior belt surface scraper assembly comprising a belt scraper control arm sub-assembly, a blade sub-assembly, and a piston sub-assembly, said sub-assemblies attached to said conveyer belt assembly frame, said control arm sub-assembly comprising a pair of like rigid arms, each pivotally connected at a pivotal support on said frame, each said arm formed of a first straight solid central rigid electrically conductive portion and a forwardly extending sleeve portion extending horizontally forwardly of said first portion, the rear portion of each of the arms connected to said piston sub-assembly, said piston sub-assembly comprising a pair of like pistons each having a rear pivotal support and an extensible piston arm, one end of said piston arm pivotally connected at a front pivot fixed to a rear portion of the adjacent arm, a pneumatic connector conduit hose operatively joining an interior chamber of said pistons to a conventional connector which is releasably connected to a source of air pressure, said blade sub-assembly comprising a flexible flat surfaced scraper blade and a rigid blade bracket support, said scraper blade held by said bracket support and extending transversely to the length of said belt, whereby said belt scraper blade is held by the control arm sub-assembly and the rear end of each of the pair of arms connects to and is movable by said piston subassembly and each of the arms is pivotally held at a bearing which is in fixed spatial relationship to the frame of the conveyer belt assembly and said belt, and said upper edge of the scraper blade matches the exterior contour of the belt on the drive roller and is the edge of a solid prismatic piece of plastic and said upper edge of blade is, in its operative position, positioned at a location on the exterior belt surface which is vertically below the center of an axle of said drive roller, said blade edge being softer than said belt and electrically conductive and insoluble in oil, and wherein, rigid steel plugs are rigidly and firmly connected to the rear of bracket, each plug having a plurality of longitudinally spaced apart transverse holes therein and holes therefor in the arm sleeve portions whereby to allow for longitudinal adjustment of the blade relative to the spatially fixedly located supports for said arms.

2. In combination, a conveyor belt assembly, an electrically conductive interior belt surface scraper assembly, and an electrically conductive exterior belt surface scraper assembly, said conveyor belt assembly comprising a rigid conveyor belt assembly frame, a series of like upper sets of idler rollers, lower idler rollers and a drive roller, each upper set of rollers comprising a horizontally extending central lower transverse roller and, laterally thereof, rollers extending transversely to the length of the belt which lateral rollers are at an angle to the horizontal portions of the belt, a lower, interior, surface of an upper run of said conveyer belt on top of the upper set of rollers, said upper run carrying particulate material toward a drive roller and said belt contacting and curving around said drive roller at a front portion of said belt, a return lower path of said belt extending from the drive pulley to a driven pulley and the exterior lower surface of the belt then riding on idler rollers, said exterior belt surface scraper assembly comprising a belt scraper control arm sub-assembly, a blade sub-assembly, and a piston sub-assembly, said sub-assemblies attached to said conveyer belt assembly frame, said control arm sub-assembly comprising a pair of like rigid arms, each pivotally connected at a pivotal support on said frame, each said arm formed of a first straight solid central rigid electrically conductive portion and a forwardly extending sleeve portion extending horizontally forwardly of said first portion, the rear portion of each of the arms connected to said piston sub-assembly, said piston sub-assembly comprising a pair of like pistons each having a rear pivotal support and an extensible piston arm, one end of said piston arm pivotally connected at a front pivot fixed to a rear portion of the adjacent arm, a pneumatic connector conduit hose operatively joining an interior chamber of said pistons to a conventional connector which is releasably connected to a source of air pressure, said blade sub-assembly comprising a flexible flat surfaced scraper blade and a rigid blade bracket support, said scraper blade held by said bracket support and extending transversely to the length of said belt, whereby said belt scraper blade is held by the control arm sub-assembly and the rear end of each of the pair of arms connects to and is movable by said piston subassembly and each of the arms is pivotally held at a bearing which is in fixed spatial relationship to the frame of the conveyer belt assembly and said belt, and said upper edge of the scraper blade matches the exterior contour of the belt on the drive roller and is the edge of a solid prismatic piece of plastic and said upper edge of blade is, in its operative position, positioned at a location on the exterior belt surface which is vertically below the center of an axle of said drive roller, said blade edge being softer than said belt and electrically conductive and insoluble in oil, said interior belt surface scraper assembly comprising an interior belt surface scraper control arm sub-assembly, a blade sub-assembly, and a second piston sub-assembly, said sub-assemblies attached to the belt conveyor frame, said scraper control arm sub-assembly comprising a second pair of like rigid arms, each pivotally connected at a pivotal support joint therefor attached to said frame of said belt conveyor, each arm formed of a first rigid electrically conductive metal portion and a forwardly extending hollow sleeve portion, the rear portion of each of said second pair of arms connected to the second piston sub-assembly, said second piston sub-assembly comprising a pair of like pistons each having a rear pivot support connection and a forward straight extensible piston arm pivotally connected at a front pivot joint fixed to a rear arm portion of the adjacent second pair of arms, a pneumatic conduit hose operatively joining an interior chamber of said pistons said conduit hose or line connected to a connector which is releasably connected to a source of air pressure for actuating said pistons, the interior belt surface blade sub-assembly comprising a flexible flat surface interior belt surface scraper blade and a rigid scraper blade bracket support, said bracket support comprising a lower rigid steel bottom bracket support plate, left and right side bracket support arms, and discharge spouts, said support plate extending horizontally laterally of and below the lower return run of said belt and transversely to the length of said belt, said side bracket support arms attached at their lower ends to the lateral ends of said bottom bracket support plate and extending laterally of the lower belt return run with portions which are located inwardly of the conveyor belt frame and above the lower belt run and extend upwardly inwardly of said conveyor belt frame below the upper belt run and upper end of said arms are located inwardly of side frame members of said frame of the conveyor belt assembly and below the upper run of said belt and are rigidly and firmly attached to an upper bracket, said upper bracket extending transversely of the length of said belt said interior belt surface scraper blade is firmly held by the interior belt surface control arm sub-assembly and the rear end of each of the second pair of arms connects to and is removed by the second piston sub-assembly and each of the second pair of arms is pivotally held at a bearing which is in fixed spatial relationship to the frame of the conveyor belt assembly and its belt and, the upper operating edge of the interior belt surface scraper blade matches the contour of the interior lower surface of said belt adjacent the drive roller and the length of the upper edge of said blade is parallel to the longitudinal axis of the pulley and said edge is in contact with and adjacent to the interior lower belt surface of the upper run of said belt close to the drive pulley, but out of contact therewith, said blade having a substantial degree of hardness and surface hardness that is not harder than the rubber surface material of belt and is pressed against the belt with a limited pressure so as to not cause the blade to wear substantially, and being oil resistant and electrically conductive.

3. Apparatus as in claim 2, wherein rigid steel plugs are rigidly and firmly connected to the rear of the lower bracket support plate each plug having a plurality of longitudinally spaced apart transverse holes therein which match holes therefor in the arm sleeve portions to allow for longitudinal adjustment of the interior belt surface scraper blade relative to the spatially fixedly located pivotal supports and for the second pair of arms.

4. Apparatus as in claim 3 wherein said spouts are rigid troughs which slope laterally and downwardly from an upper central position on the side of interior belt surface scraper blade distant from the drive roller and said troughs are rigid smooth imperforate plates each provided with a groove open upwardly and is fixedly attached and adjacent to the upper bracket and extends laterally thereof to a terminal lateral portion lateral to the lateral sides of said lower run of said belt, whereby material discharged from the lower surface of said belt is collected in such troughs and passed downwardly and laterally along such troughs out of contact with said lower run of said belt.

5. Apparatus as in claim 2 wherein said blades are each an electrically conductive polyurethane polymer.

6. Apparatus as in claim 5 wherein each said blade edge has a surface hardness of no greater than 80 durometer on Shore A test and a tear strength of 420 p.l.i. on die C.

* * * * *